United States Patent
Torres et al.

(10) Patent No.: US 10,666,137 B2
(45) Date of Patent: May 26, 2020

(54) METHOD AND CIRCUITRY FOR SENSING AND CONTROLLING A CURRENT

(71) Applicant: TEXAS INSTRUMENTS INCORPORATED, Dallas, TX (US)

(72) Inventors: Erick Omar Torres, Allen, TX (US); Harish Venkataraman, Wylie, TX (US); Philomena C. Brady, Corinth, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/188,418

(22) Filed: Nov. 13, 2018

(65) Prior Publication Data

US 2019/0081564 A1 Mar. 14, 2019

Related U.S. Application Data

(63) Continuation of application No. 14/274,848, filed on May 12, 2014, now Pat. No. 10,128,749.

(51) Int. Cl.
*H02M 3/156* (2006.01)
*H02M 3/158* (2006.01)
*H02M 1/00* (2006.01)

(52) U.S. Cl.
CPC ........... *H02M 3/156* (2013.01); *H02M 3/158* (2013.01); *H02M 2001/0009* (2013.01)

(58) Field of Classification Search
CPC . H02M 2003/1566; H02M 2003/1557; H02M 3/156; H02M 3/158; H02M 3/1588;
(Continued)

(56) References Cited

U.S. PATENT DOCUMENTS 7,479,771 B2 * 1/2009 Ryu ..................... H02M 3/156
323/271
7,706,156 B2 4/2010 Hsieh et al.
(Continued)

FOREIGN PATENT DOCUMENTS

CN 101666824 7/2011
CN 102577060 A 7/2012
(Continued)

OTHER PUBLICATIONS

English Translation of Chinese Office Action for Application No. CN 2014800787918; dated Jul. 17, 2017; 8 pages.

*Primary Examiner* — Bryan R Perez
(74) *Attorney, Agent, or Firm* — Michael A. Davis Jr.; Charles A. Brill; Frank D. Cimino

(57) ABSTRACT

An inductor conducts a first current, which is variable. A first transistor is coupled through the inductor to an output node. The first transistor alternately switches on and off in response to a voltage signal, so that the first current is: enhanced while the first transistor is switched on in response to the voltage signal; and limited while the first transistor is switched off in response to the voltage signal. A second transistor is coupled to the first transistor. The second transistor conducts a second current, which is variable. On/off switching of the second transistor is independent of the voltage signal. Control circuitry senses the second current and adjusts the voltage signal to alternately switch the first transistor on and off in response to: the sensing of the second current; and a voltage of the output node.

11 Claims, 3 Drawing Sheets

(58) Field of Classification Search
CPC .... H02M 3/155; H02M 3/1582; H02M 3/157; H02M 3/1563
USPC .......................................... 323/282–285, 237
See application file for complete search history.

(56) References Cited

U.S. PATENT DOCUMENTS

| | | | |
|---|---|---|---|
| 8,362,755 B2 | 1/2013 | Noda | |
| 8,520,413 B2 * | 8/2013 | Tran ..................... | H02M 3/155 323/222 |
| 8,541,999 B2 | 9/2013 | Athas et al. | |
| 2003/0034766 A1 | 2/2003 | Zafarana et al. | |
| 2008/0019155 A1 | 1/2008 | Morishima et al. | |
| 2008/0224676 A1 | 9/2008 | Kudo et al. | |
| 2009/0033238 A1 | 2/2009 | Hollander | |
| 2009/0033289 A1 | 2/2009 | Xing et al. | |
| 2010/0026257 A1 * | 2/2010 | Huang .................. | H02M 3/158 323/282 |
| 2010/0060250 A1 * | 3/2010 | Noda .................... | H02M 3/156 323/282 |
| 2010/0156372 A1 * | 6/2010 | Kobayashi ............. | H02M 1/08 323/282 |
| 2014/0152284 A1 * | 6/2014 | Rozek .................. | H02M 3/156 323/284 |

FOREIGN PATENT DOCUMENTS

| | | |
|---|---|---|
| CN | 103004071 A | 3/2013 |
| WO | 2011016974 A2 | 2/2011 |
| WO | 2012015427 A1 | 2/2012 |
| WO | 2014043219 | 3/2014 |

* cited by examiner

METHOD AND CIRCUITRY FOR SENSING AND CONTROLLING A CURRENT

CROSS-REFERENCE TO RELATED APPLICATION

This application is a continuation of U.S. patent application Ser. No. 14/274,848 filed May 12, 2014, which is hereby fully incorporated herein by reference.

BACKGROUND

This relates generally to electronic circuitry, and more particularly to a method and circuitry for sensing and controlling a current.

FIG. 1 (prior art) is a schematic electrical circuit diagram of a conventional step down converter, indicated generally at 100. For sensing current of a high-side power n-channel field-effect transistor ("NFET") $MN_1$, an NFET $MN_{SNS}$ is connected in parallel with $MN_1$, so that both of them share common drain and gate connections. The drains of $MN_1$ and $MN_{SNS}$ are connected to an input voltage node (having a voltage $V_{IN}$). The gates of $MN_1$ and $MN_{SNS}$ are connected to an output of a driver 102, which: (a) receives a voltage signal $V_{GD}$ from control circuitry 104; and (b) drives $V_{GD}$ through such output to those gates.

A source of $MN_{SNS}$ is connected to a node A, which is further connected to a first input ("+") of an amplifier 106. A source of $MN_1$ is connected to a node B (having a voltage $V_{SW}$), which is further connected to a second input ("−") of the amplifier 106. An output of the amplifier 106 is connected to a gate of an NFET $MN_A$.

A source of $MN_A$ is connected to a ground, and a drain of $MN_A$ is connected to the node A as feedback. Accordingly, while the amplifier 106 is active, $MN_A$ and the amplifier 106 operate together for holding the node A's voltage relatively near (e.g., slightly above) the node B's voltage. In that manner, $MN_{SNS}$ senses a current that flows through $MN_1$, while $MN_A$ senses a current that flows through $MN_{SNS}$. An NFET $MN_B$ mirrors a current that flows through $MN_A$.

While $MN_1$ and $MN_{SNS}$ are turned on, they conduct respective amounts of current, according to a channel width ratio between $MN_1$ and $MN_{SNS}$. In one example, such channel width ratio is relatively large, so that $MN_1$ conducts current on an order of amps, while $MN_{SNS}$, $MN_A$ and $MN_B$ conduct current on an order of microamps.

As shown in FIG. 1, the node B is coupled through a diode 108 (having a voltage drop $-V_D$) to the ground. Also, the node B is coupled through an inductor L (having a variable current $I_L$) to a node C (having a voltage $V_{OUT}$). The node C is coupled through a capacitor C to the ground. Further, the node C is coupled through a load 110 (having a current $I_{LOAD}$) to the ground.

The control circuitry 104 is connected to a drain of $MN_B$. In response to a current $I_{SENSE}$ that flows through $MN_B$, and in response to $V_{OUT}$, the control circuitry 104 suitably adjusts $V_{GD}$ as feedback to control (e.g., selectively enhance, and selectively limit) $I_L$ by alternately switching $MN_1$'s gate on and off.

During each switching cycle, $V_{SW}$ swings from $-V_D$ to near $V_{IN}$. In one example, the amplifier 106: (a) is inactive while $V_{SW} \approx -V_D$, which is outside an input range of the amplifier 106; and (b) becomes active when $V_{SW}$ rises to near $V_{IN}$. Nevertheless, while $V_{SW}$ rises, $I_{SENSE}$ incorrectly overshoots, because $MN_1$'s initial $V_{DS} \approx V_{IN}+V_D$. Accordingly, the control circuitry 104 ignores $I_{SENSE}$ at the beginning (blanking time) of each switching cycle, which limits a minimum duty cycle of the circuitry 100 and its maximum switching frequency.

Also, through the node B, the second input ("−") of the amplifier 106 is directly connected to an external high-voltage switching node, which exposes the second input ("−") to the switching node's parasitics and electrostatic discharge ("ESD"). Accordingly, to protect the second input ("−") against high-voltage ESD, the amplifier 106 includes additional circuitry for such protection, even if $MN_1$ is self-protecting.

SUMMARY

An inductor conducts a first current, which is variable. A first transistor is coupled through the inductor to an output node. The first transistor alternately switches on and off in response to a voltage signal, so that the first current is: enhanced while the first transistor is switched on in response to the voltage signal; and limited while the first transistor is switched off in response to the voltage signal. A second transistor is coupled to the first transistor. The second transistor conducts a second current, which is variable. On/off switching of the second transistor is independent of the voltage signal. Control circuitry senses the second current and adjusts the voltage signal to alternately switch the first transistor on and off in response to: the sensing of the second current; and a voltage of the output node.

DETAILED DESCRIPTION OF EXAMPLE EMBODIMENTS

Figure 1:
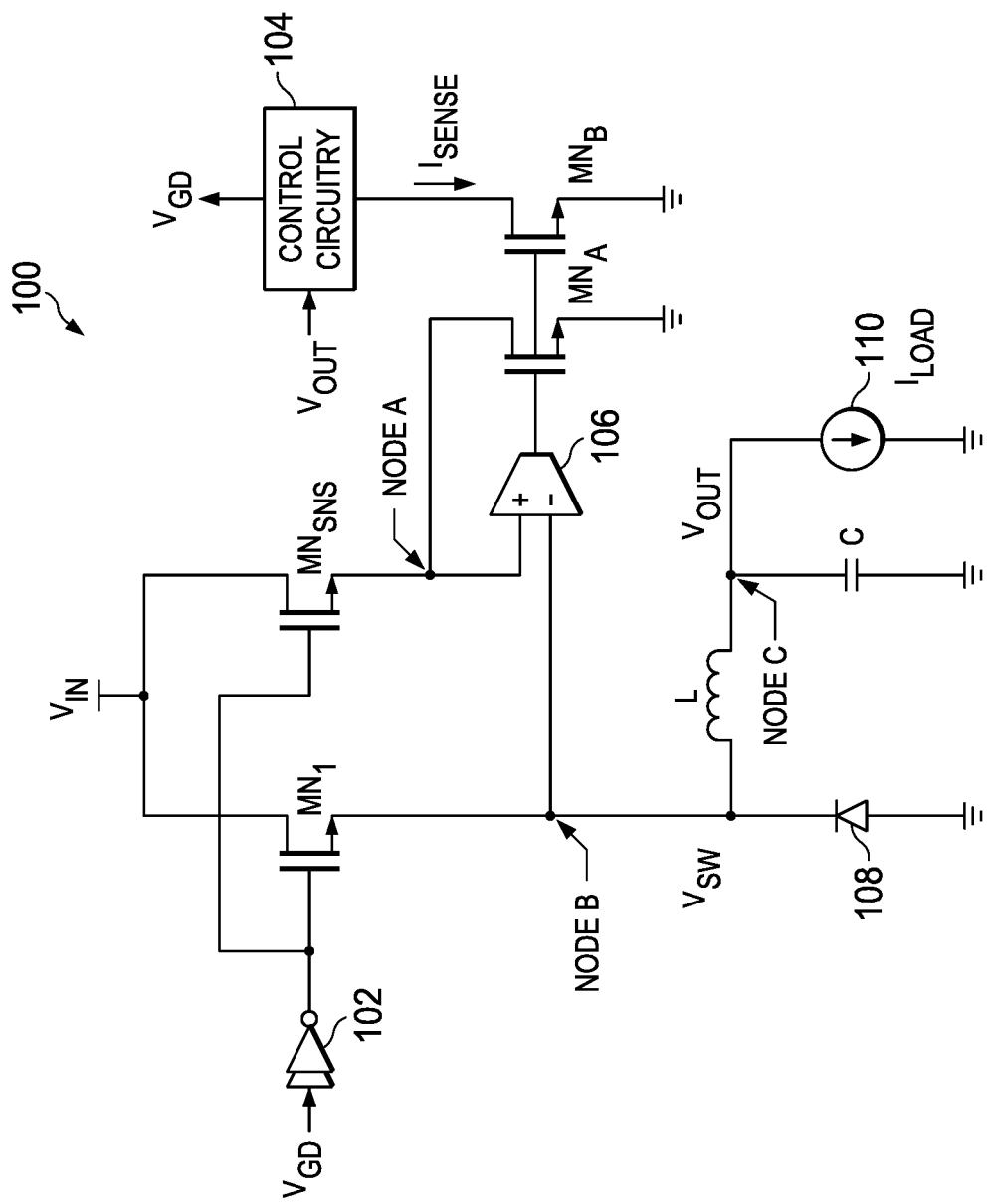
FIG. 1 (prior art) is a schematic electrical circuit diagram of a conventional step down converter.
Figure 2:
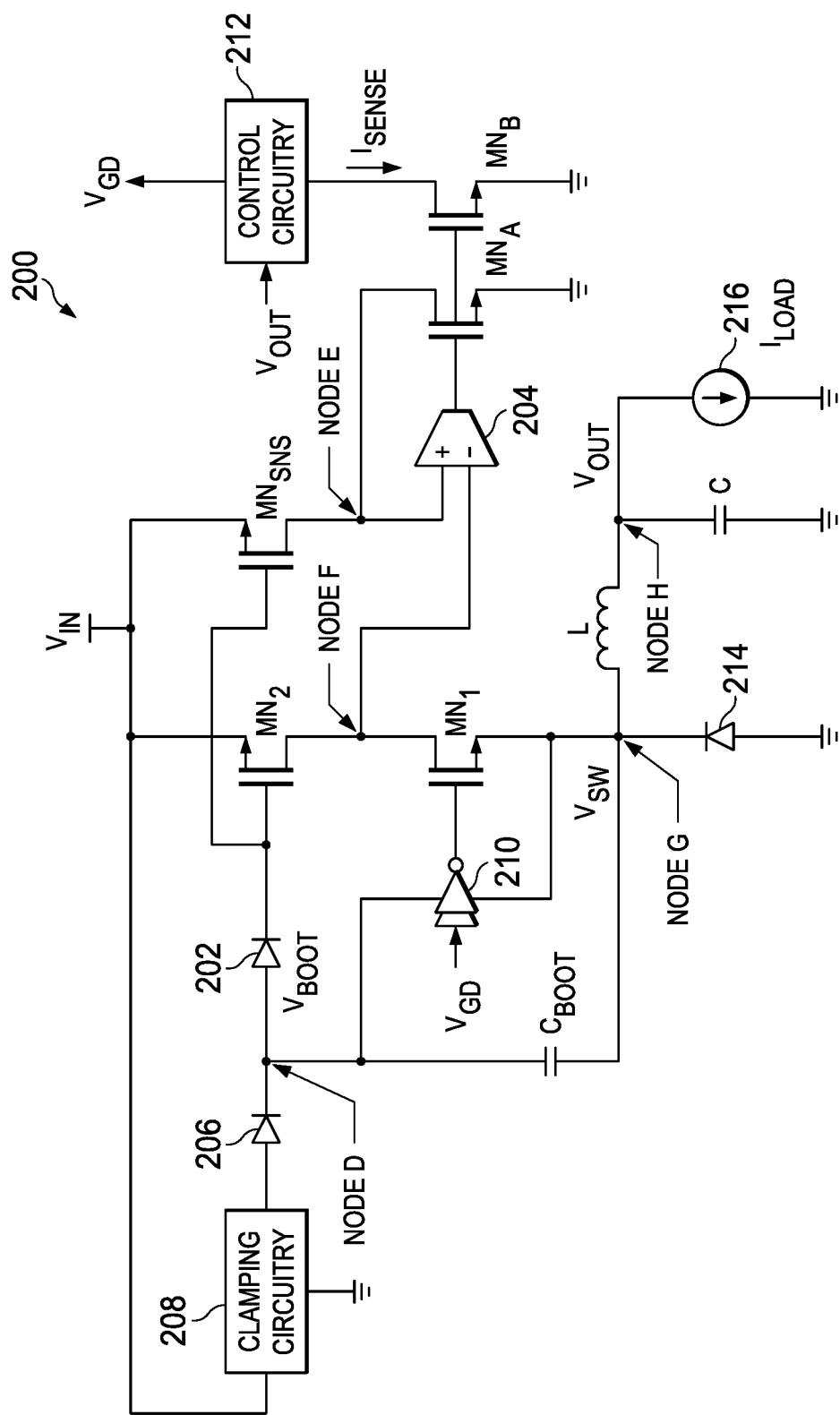
FIG. 2 is a schematic electrical circuit diagram of a step down converter of the illustrative embodiments.

FIG. 2 is a schematic electrical circuit diagram of a step down converter, indicated generally at 200, of the illustrative embodiments. In FIG. 2, an NFET $MN_{SNS}$ is connected in parallel with an NFET $MN_2$, so that both of them share common source and gate connections. The sources of $MN_2$ and $MN_{SNS}$ are connected to an input voltage node (having a voltage $V_{IN}$). The gates of $MN_2$ and $MN_{SNS}$ are coupled through a diode 202 to a node D. The node D has a voltage $V_{BOOT}$.

A drain of $MN_{SNS}$ is connected to a node E, which is further connected to a first input ("+") of an amplifier 204. A drain of $MN_2$ is connected to a node F, which is further connected to a second input ("−") of the amplifier 204. An output of the amplifier 204 is connected to a gate of an NFET $MN_A$.

A source of $MN_A$ is connected to a ground, and a drain of $MN_A$ is connected to the node E as feedback. While the amplifier 204 is active, $MN_A$ and the amplifier 204 operate together for holding the node E's voltage relatively near (e.g., slightly above) the node F's voltage. In that manner, $MN_{SNS}$ mirrors a variable current that flows through $MN_2$, while $MN_A$ senses a current that flows through $MN_{SNS}$. An NFET $MN_B$ mirrors a current that flows through $MN_A$.

While $MN_2$ and $MN_{SNS}$ are turned on, they conduct respective amounts of current, according to a channel width ratio between $MN_2$ and $MN_{SNS}$. In one example, such channel width ratio is relatively large, so that $MN_2$ conducts current on an order of amps, while $MN_{SNS}$, $MN_A$ and $MN_B$ conduct current on an order of microamps.

The node D is coupled through a diode 206 to clamping circuitry 208, which receives power from its connection between the input voltage node and the ground. Also, the node D is coupled through a capacitor $C_{BOOT}$ to a node G (having a voltage $V_{SW}$). A driver 210 is coupled between the node D and the node G, so the driver 210 receives its power from $C_{BOOT}$.

A gate of an NFET $MN_1$ is connected to an output of the driver 210, which: (a) receives a voltage signal $V_{GD}$ from control circuitry 212; and (b) drives $V_{GD}$ through such output to such gate. A drain of $MN_1$ is connected to the node F, and a source of $MN_1$ is connected to the node G.

As shown in FIG. 2, the node G is coupled through a diode 214 (having a voltage drop $-V_D$) to the ground. Also, the node G is coupled through an inductor L (having a variable current $I_L$) to a node H (having a voltage $V_{OUT}$). The node H is coupled through a capacitor C to the ground. Further, the node H is coupled through a load 216 (having a current $I_{LOAD}$) to the ground.

The control circuitry 212 is connected to a drain of $MN_B$. In response to a current $I_{SENSE}$ that flows through $MN_B$, and in response to $V_{OUT}$, the control circuitry 212 suitably adjusts $V_{GD}$ as feedback to control $I_L$ by alternately switching $MN_1$'s gate on and off. For example: (a) $MN_1$ enhances $I_L$ while $MN_1$ is switched on in response to $V_{GD}$; and (b) $MN_1$ limits $I_L$ while $MN_1$ is switched off in response to $V_{GD}$.

In one example of the circuitry 200 operation, $V_{IN}$ is approximately 10 volts, and the clamping circuitry 208 operates to charge $C_{BOOT}$, so that $C_{BOOT}$ has a substantially constant voltage of ~5 volts. In that manner, $V_{BOOT} - V_{SW} = $ ~5 volts, which is always sufficient to power the driver 210, and $V_{BOOT}$ is always high enough to turn on $MN_2$. Accordingly, in such operation, $MN_2$ is always on and continues to conduct at least some current, irrespective of whether $MN_1$ is switched on, so that on/off switching of $MN_2$ is independent of $V_{GD}$.

While $MN_1$ is switched off, $V_{SW} = -V_D$, (e.g., −0.7 volts), $V_{BOOT} = V_{SW} + $ ~5 volts, and $MN_2$'s $V_{DS} \approx 0$ volts (e.g., because current isn't flowing through $MN_2$). While $MN_1$ is switched on, $V_{SW} \approx V_{IN} = 10$ volts, $V_{BOOT} = V_{SW} + $ ~5 volts, and $MN_2$'s $V_{DS} \approx 100$s of millivolts (e.g., $MN_2$'s resistance multiplied by current flowing through $MN_2$). Accordingly, because $MN_2$'s drain voltage $V_D$ is always equal to $V_{IN} = 10$ volts, $MN_2$'s $V_{DS}$ swings between ~0 volts and 100s of millivolts, even while $V_{SW}$ swings between $-V_D$ and ~10 volts.

In that manner, $I_{SENSE}$ has less overshoot (e.g., current spike) in response to $MN_1$ being turned on. A speed of $I_{SENSE}$ settling is primarily determined by a speed of $MN_A$ and the amplifier 204. Because $I_{SENSE}$ has less overshoot in response to $MN_1$ being turned on, the control circuitry 212 has less blanking time at the beginning of each switching cycle. Accordingly, the control circuitry 212 is more quickly responsive to $I_{SENSE}$, which allows the circuitry 200 to operate at lower duty cycles (e.g., higher input-to-output voltage ratios) and higher switching frequencies (e.g., smaller L and C).

Moreover, although the node G is directly connected to an external high-voltage switching node, the second input ("−") of the amplifier 204 is directly connected to the node F instead of the node G. Accordingly, the second input ("−") is protected against the switching node's parasitics and ESD, without requiring the amplifier 204 to include additional circuitry for such protection.

Also, $MN_2$ helps to protect $V_{IN}$ against corruption by $V_{OUT}$. In comparison to $MN_1$, $MN_2$ can occupy less silicon area for a given resistance. For example, $MN_2$ and $MN_{SNS}$ can be relatively low-voltage transistors (e.g., because they do not need to stand off the input voltage, but instead only their ohmic drop), which enables better matching between them for more accurate current sensing.

Figure 3A:
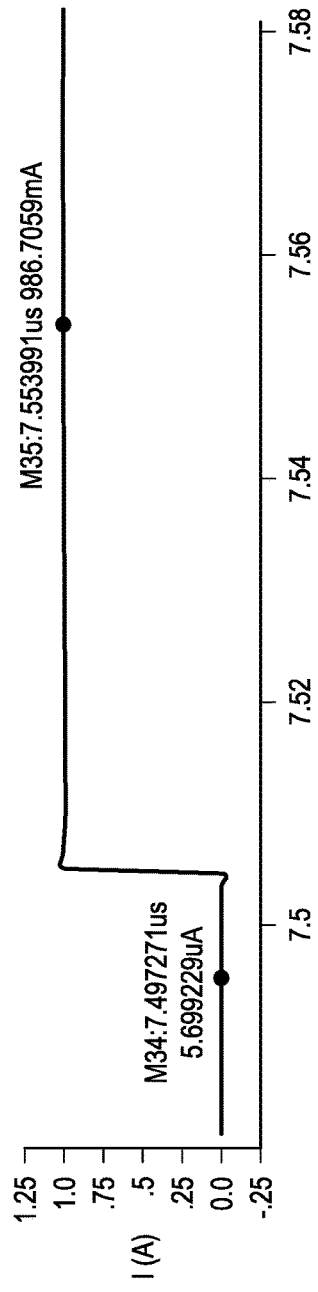
FIG. 3A is a first graph for showing an example operation of the circuitry of FIG. 2.
Figure 3B:
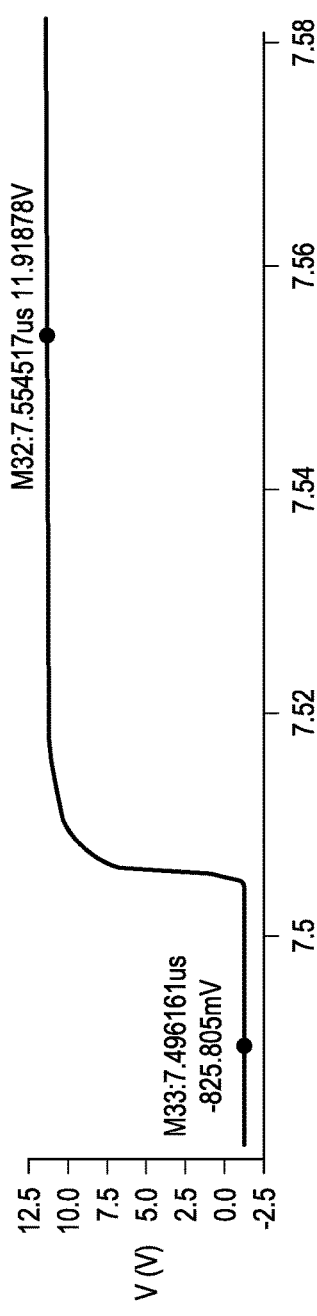
FIG. 3B is a second graph for showing the example operation of the circuitry of FIG. 2.
Figure 3C:
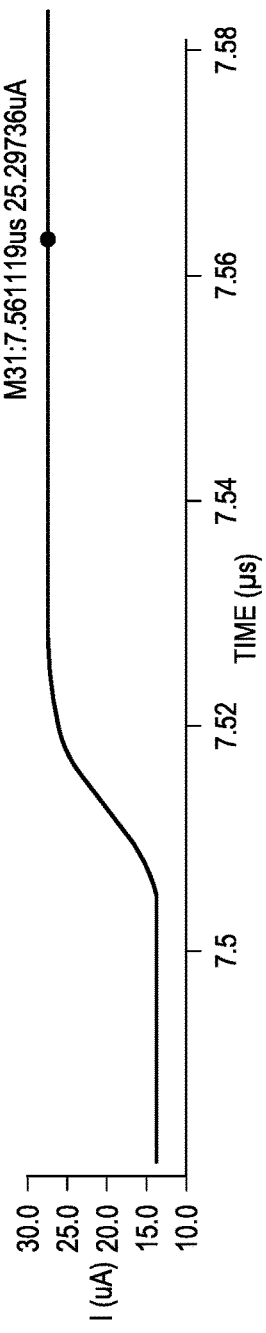
FIG. 3C is a third graph for showing the example operation of the circuitry of FIG. 2.

FIG. 3A is a graph of current through $MN_1$. FIG. 3B is a graph of the voltage $V_{SW}$. FIG. 3C is a graph of the current $I_{SENSE}$. $V_{BOOT}$ is always high enough to turn on $MN_2$ (so that $MN_2$ continues to conduct at least some current, irrespective of whether $MN_1$ is switched on), so the node F's voltage swings within a range of several hundred millivolts, which is significantly less than a range of the voltage $V_{SW}$. $MN_2$'s $V_{DS}$ starts from ~0 volts (instead of $V_{IN}$), so that overshoot is substantially avoided in the current $I_{SENSE}$. As shown in FIG. 3C, the current $I_{SENSE}$ settles at ~25 microamps with relatively short delay (according to speed of feedback between $MN_A$ and the amplifier 204).

Modifications are possible in the described embodiments, and other embodiments are possible, within the scope of the claims.

What is claimed is:

1. Circuitry, comprising: an input terminal a switching terminal; a first transistor having a first gate and first and second terminals, the first terminal connected to the switching terminal; a second transistor having a second gate and third and fourth terminals, the third terminal connected to the second terminal, and the fourth terminal connected to the input terminal, in which a voltage at the second gate is independent of a voltage at the first gate;
    a capacitor coupled between the first terminal and the second gate;
    clamping circuitry coupled to the capacitor; a ground terminal;
    a third transistor having a third gate and fifth and sixth terminals, the third gate connected to the second gate, and the sixth terminal connected to the fourth terminal;
    a fourth transistor having a fourth gate and seventh and eighth terminals, the eighth terminal connected to the fifth terminal, and the seventh terminal connected to the ground terminal;
    and an amplifier having an amplifier output and first and second amplifier inputs, the first amplifier input connected to the second terminal, the second amplifier input connected to the fifth terminal, and the amplifier output connected to the fourth gate;
    and control circuitry coupled to the fourth transistor and coupled between the switching terminal; and the first gate, the control circuitry configured to adjust the voltage at the first gate responsive to a voltage at the switching terminal and a current through the fourth transistor.

2. The circuitry of claim 1, further comprising:
    a driver having a driver input terminal, a driver output terminal and first and second power terminals, the driver output terminal coupled to the first gate, the capacitor coupled between the first and second power terminals, and the control circuitry coupled through the driver to the first gate.

3. The circuitry of claim 1, wherein the second transistor is configured to conduct a current responsive to a voltage at the second gate, irrespective of whether the first transistor is switched on.

4. The circuitry of claim 1, wherein the clamping circuitry is coupled through at least one diode to the second gate.

5. The circuitry of claim 1, further comprising:
a fifth transistor having a fifth gate and ninth and tenth terminals, the fifth gate coupled to the fourth gate, the ninth terminal coupled to the ground terminal, and the control circuitry coupled through the tenth terminal to the fourth transistor.

6. The circuitry of claim 5, wherein the first, second, third, fourth and fifth transistors are n-channel field-effect transistors.

7. Circuitry, comprising: a ground terminal; an input terminal; an output terminal adapted to be connected to a first terminal of an inductor;
a first transistor having a first gate and first and second terminals, the first terminal adapted to be connected to a second terminal of the inductor, and the first transistor configured to alternately switch on or off responsive to a voltage at the first gate, in which a variable first current through the inductor is: enhanced while the first transistor is switched on; and reduced while the first transistor is switched off; a second transistor having a second gate and third and fourth terminals, the third terminal connected to the second terminal, the fourth terminal connected to the input terminal, and the second transistor configured to conduct a second current responsive to a voltage at the second gate, in which the voltage at the second gate is independent of the voltage at the first gate, and the second current is variable;
a third transistor having a third gate and fifth and sixth terminals, the third gate connected to the second gate, the sixth terminal connected to the fourth terminal, and the third transistor configured to conduct a third current that mirrors the second current; a fourth transistor having a fourth gate and seventh and eighth terminals, the eighth terminal connected to the fifth terminal, the seventh terminal connected to the ground terminal, and the fourth transistor configured to conduct a fourth current that senses the third current; an amplifier having an amplifier output and first and second amplifier inputs, the first amplifier input connected to the second terminal, the second amplifier input connected to the fifth terminal, the amplifier output connected to the fourth gate, and the amplifier configured to hold a voltage at the second terminal near a voltage at the fifth terminal;
a fifth transistor having a fifth gate and ninth and tenth terminals, the fifth gate connected to the fourth gate, the ninth terminal connected to the ground terminal, and the fifth transistor configured to conduct a fifth current that mirrors the fourth current;
a capacitor coupled between the first terminal and the second gate;
clamping circuitry coupled to the capacitor, the clamping circuitry configured to charge the capacitor to a particular voltage;
and control circuitry coupled to the tenth terminal, the output terminal and the first gate, the control circuitry configured to sense the second current and adjust the voltage at the first gate responsive to: a voltage at the output terminal; and the sensing of the second current, in which sensing the second current includes sensing the second current by sensing the fifth current.

8. The circuitry of claim 7, further comprising:
a driver having a driver input terminal, a driver output terminal and first and second power terminals, the driver output terminal coupled to the first gate, the capacitor coupled between the first and second power terminals, and the driver configured to: receive power from the capacitor; and drive the voltage at the first gate responsive to a voltage at the driver input terminal.

9. The circuitry of claim 7, wherein the second transistor is configured to conduct the second current irrespective of whether the first transistor is switched on.

10. The circuitry of claim 7, wherein the clamping circuitry is coupled through at least one diode to the second gate.

11. The circuitry of claim 7, wherein the first, second, third, fourth and fifth transistors are n-channel field-effect transistors.

* * * * *